(12) United States Patent
Hung et al.

(10) Patent No.: US 10,317,058 B2
(45) Date of Patent: Jun. 11, 2019

(54) SUPPORT ARM DEVICE

(71) Applicant: MODERNSOLID INDUSTRIAL CO., LTD., Taichung (TW)

(72) Inventors: Chin-Jui Hung, Taichung (TW); Chun-Hung Yeh, Taichung (TW)

(73) Assignee: Modernsolid Industrial Co., Ltd., Taichung (TW)

(*) Notice: Subject to any disclaimer, the term of this patent is extended or adjusted under 35 U.S.C. 154(b) by 0 days.

(21) Appl. No.: 15/720,292

(22) Filed: Sep. 29, 2017

(65) Prior Publication Data

US 2018/0112860 A1 Apr. 26, 2018

(30) Foreign Application Priority Data

Oct. 21, 2016 (TW) .............................. 105216079 A

(51) Int. Cl.
*F16M 13/00* (2006.01)
*F21V 21/28* (2006.01)
*F16M 11/00* (2006.01)
*F16M 11/06* (2006.01)

(52) U.S. Cl.
CPC ............. *F21V 21/28* (2013.01); *F16M 11/00* (2013.01); *F16M 11/06* (2013.01)

(58) Field of Classification Search
CPC .......... F16M 11/06; F16M 11/00; F21V 21/28
See application file for complete search history.

(56) References Cited

U.S. PATENT DOCUMENTS

| | | | | |
|---|---|---|---|---|
| 4,082,244 A * | 4/1978 | Groff | ...................... | A61G 15/16 248/280.11 |
| 4,160,536 A * | 7/1979 | Krogsrud | ............... | F16M 11/04 248/123.11 |
| 6,732,988 B2 * | 5/2004 | Ihalainen | ............... | A61B 6/145 248/276.1 |
| 8,931,748 B2 * | 1/2015 | Bowman | ................ | F16M 11/10 248/280.11 |
| 8,960,632 B2 * | 2/2015 | Fallows | ............. | F16M 11/2092 248/276.1 |

* cited by examiner

*Primary Examiner* — Amy J. Sterling
(74) *Attorney, Agent, or Firm* — Fox Rothschild LLP; Robert J. Sacco; Carol E. Thorstad-Forsyth

(57) ABSTRACT

A support arm device is pivotally connected between first and second link members, and includes a main arm, a seat member, an adjusting member, a driven member and a resilient member. The main arm is pivotally connected to the first and second link members. The seat member is movable relative to the main arm. The adjusting member is rotatably mounted to the main arm. The driven member is movably mounted to the main arm. Rotation of the adjusting member drives movement of the driven member to adjust a distance between the driven member and the seat member. The resilient member is coupled to the driven member and the seat member.

18 Claims, 13 Drawing Sheets

SUPPORT ARM DEVICE

CROSS-REFERENCE TO RELATED APPLICATION

This application claims priority of Taiwanese Patent Application No. 105216079, filed on Oct. 21, 2016.

FIELD

The disclosure relates to a support device, and more particularly to a support arm device.

BACKGROUND

A conventional support arm device disclosed in Taiwanese Utility Model Patent No. M520228 is for suspending an object at different heights, and employs a pneumatic cylinder to maintain the height-wise position of the object. However, the pneumatic cylinder may be relatively costly.

SUMMARY

Therefore, an object of the disclosure is to provide a support arm device that can alleviate the drawback of the prior art.

According to the disclosure, the support arm device is pivotally connected between first and second link members, and includes an arm unit, a pivot unit, an adjusting member, a driven member and at least one resilient member. The arm unit includes a main arm that has two opposite ends respectively and pivotally connected to the first and second link members. The pivot unit includes a seat member that is pivotally connected to the first link member and that is movable relative to the main arm. The adjusting member is rotatably mounted to the main arm. The driven member is movably mounted to the main arm and is associated with the adjusting member. Rotation of the adjusting member relative to the main arm about a rotating axis drives movement of the driven member relative to the main arm in a direction that is substantially orthogonal to the rotating axis, so as to adjust a distance between the driven member and the seat member. The resilient member has two opposite ends that are respectively coupled to the driven member and the seat member.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
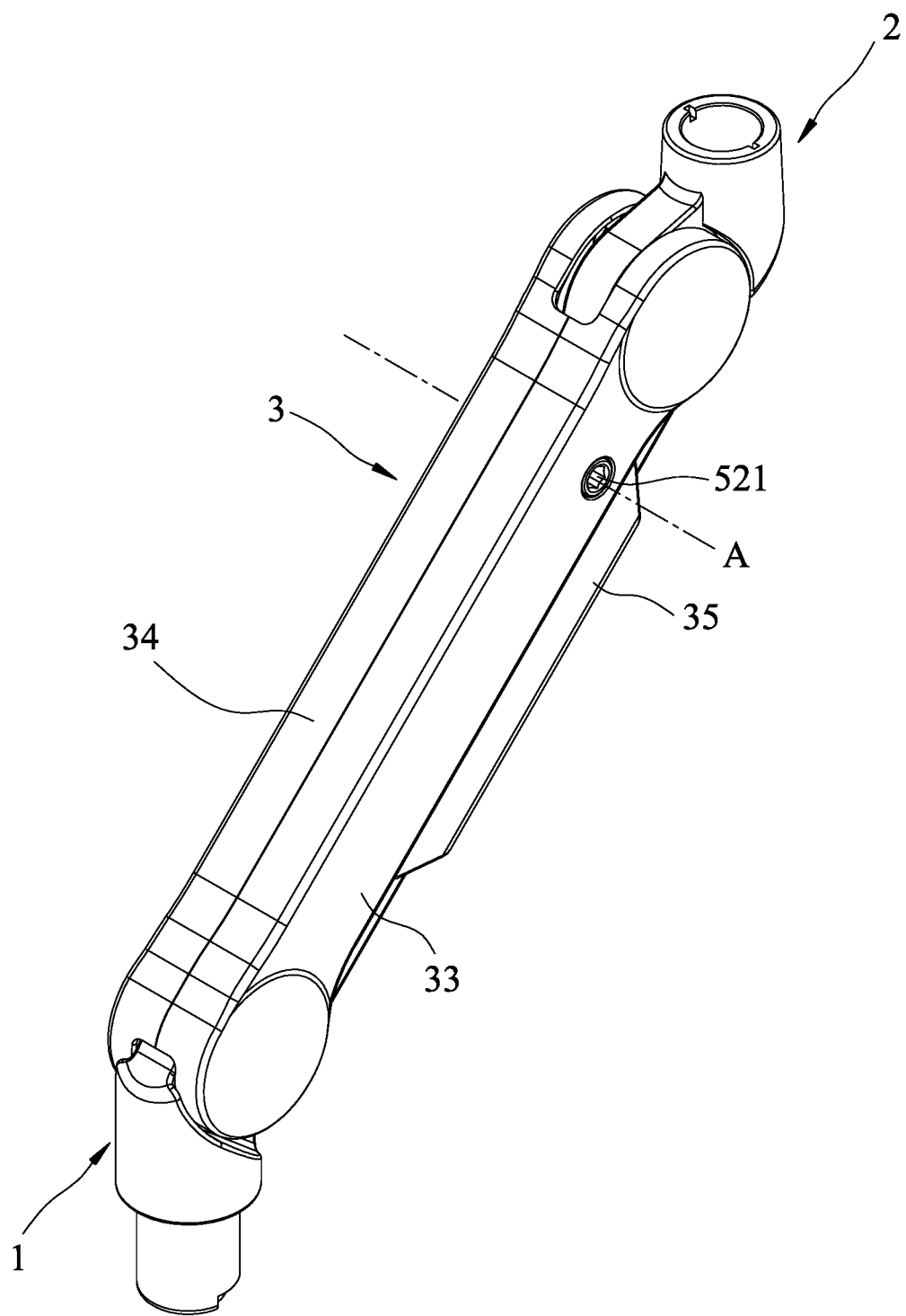
FIG. 1 is a perspective view illustrating an embodiment of the support arm device according to the disclosure.
Figure 2:
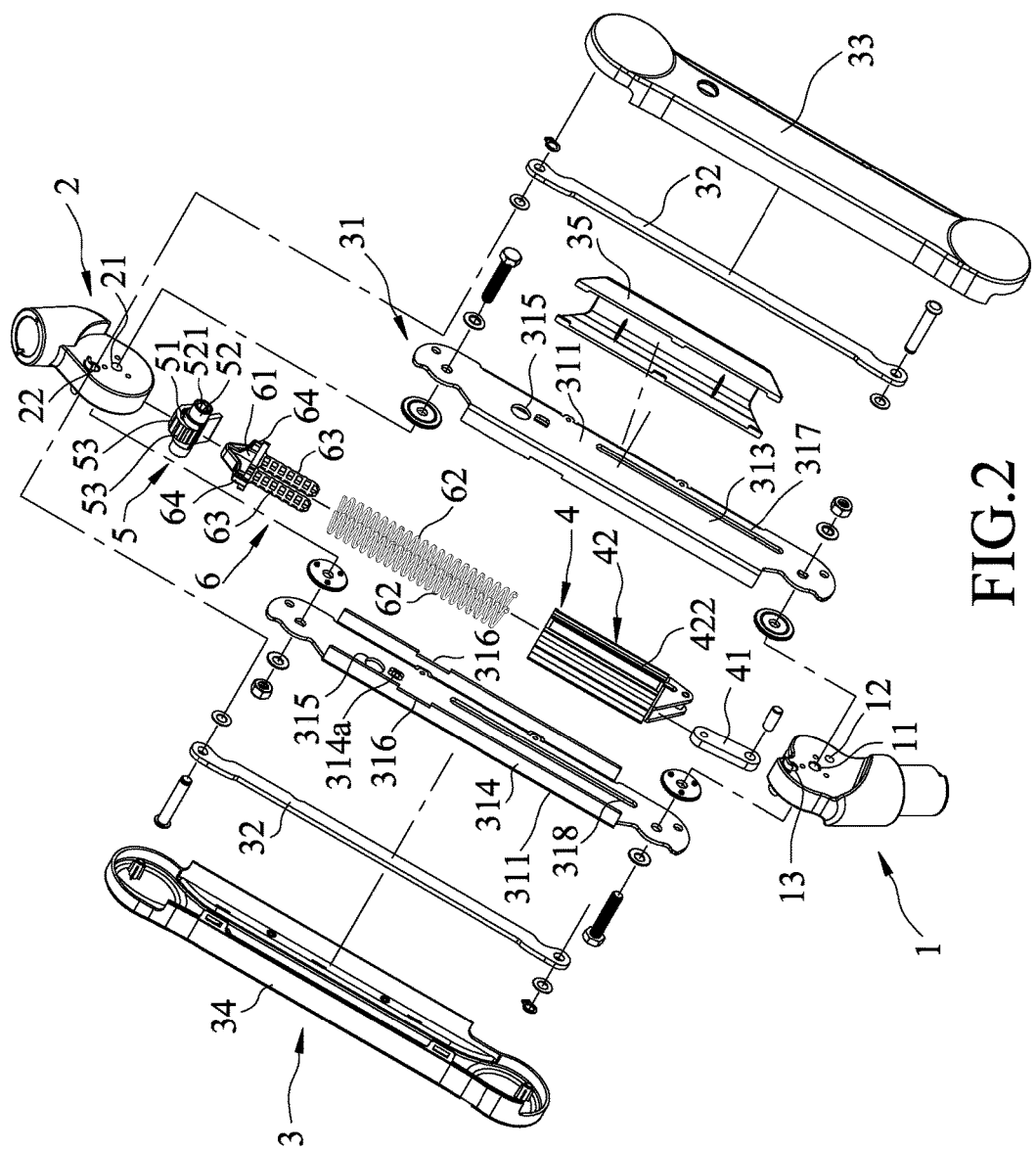
FIG. 2 is an exploded perspective view illustrating the embodiment.
Figure 3:
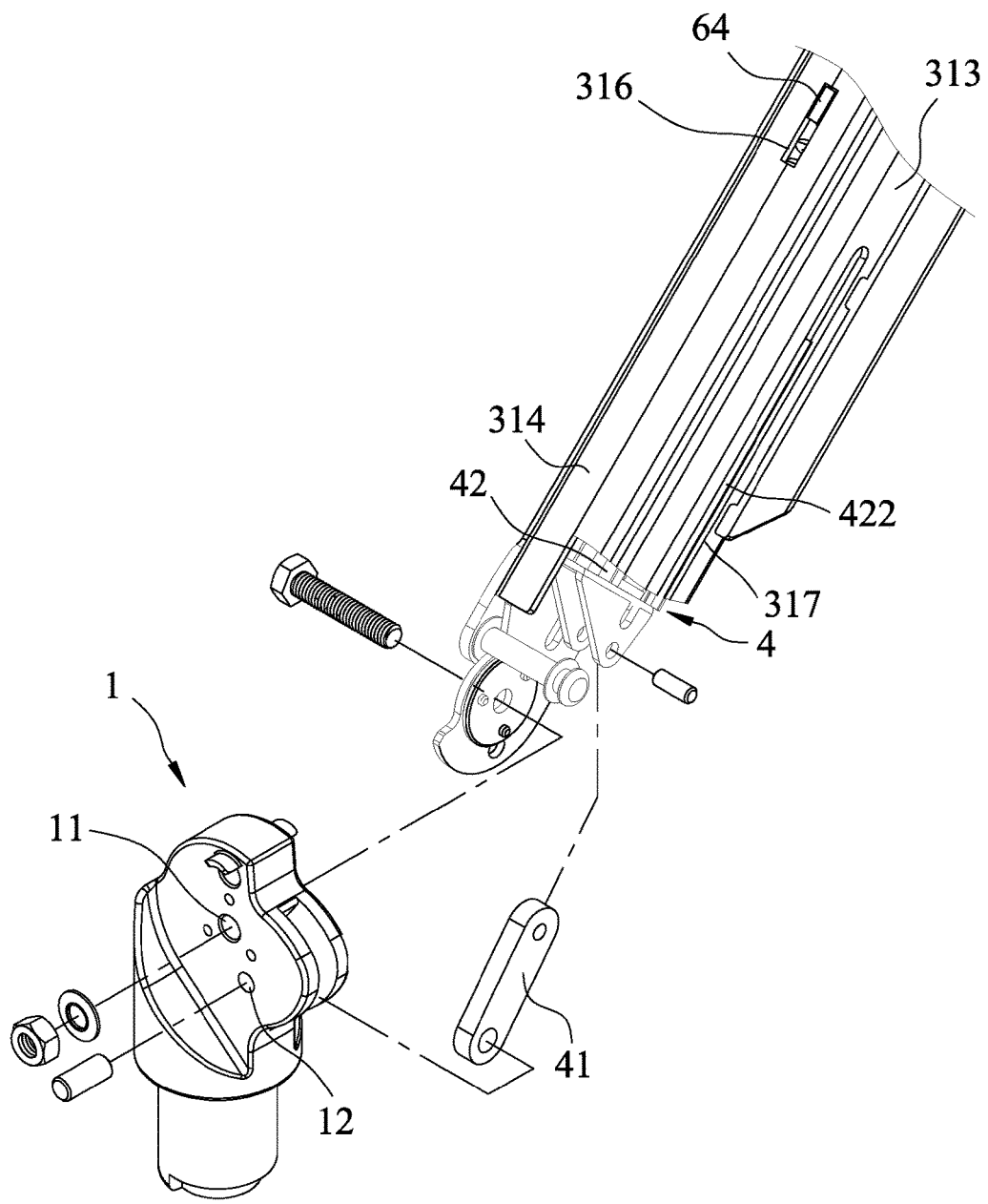
FIG. 3 is a fragmentary, partly exploded perspective view illustrating the embodiment.

Referring to FIGS. 1 to 4, the embodiment of the support arm device according to the disclosure is pivotally connected between first and second link members 1, 2, and includes an arm unit 3, a pivot unit 4, an adjusting member 5, a driven member 6 and a plurality of resilient members 62. The first link member 1 has a main pivoted portion 11, an auxiliary pivoted portion 13, and a retention pivoted portion 12 that is spaced apart from the main pivoted portion 11. The second link member 2 has a main pivoted portion 21 and an auxiliary pivoted portion 22.

The arm unit 3 includes a main arm 31 that has two opposite lateral surfaces 311, two auxiliary arms 32, a first cover member 33 that covers one of the lateral surfaces 311 of the main arm 31, a second cover member 34 that covers the other one of the lateral surfaces 311 of the main arm 31, and a third cover member 35 that is connected to lower portions of the first and second cover members 33, 34.

The main arm 31 has two opposite longitudinal ends respectively and pivotally connected to the main pivoted portion 11 of the first link member 1 and the main pivoted portion 21 of the second link member 2. In one embodiment, the main arm 31 consists of first and second lateral arm parts 313, 314 that respectively have the lateral surfaces 311 of the main arm 31 and that cooperatively define a retaining space 312 therebetween. Each of the first and second lateral arm parts 313, 314 is formed with a pivot hole 315 that is in spatial communication with the retaining space 312 and that is aligned with the pivot hole 315 of the other one of the first and second lateral arm parts 313, 314 along a rotating axis (A), and a slide groove 317, 318 that is in spatial communication with the retaining space 312 and that extends in the longitudinal direction of the main arm 31. At least one of the pivot holes 315 of the first and second lateral arm parts 313, 314 is formed through the corresponding one of the first and second lateral arm parts 313, 314. The first and second lateral arm parts 313, 314 further cooperatively define a plurality of limiting grooves 316 each of which extends in the longitudinal direction of the main arm 31, and is in spatial communication with the retaining space 312. The rotating axis (A) is substantially orthogonal to the longitudinal direction of the main arm 31.

Each of the auxiliary arms 32 has two opposite ends respectively and pivotally connected to the auxiliary pivoted portion 13 of the first link member 1 and the auxiliary pivoted portion 22 of the second link member 2, and cooperates with the main arm 31 and the first and second link members 1, 2 to constitute a four-bar linkage.

The pivot unit 4 includes a pivot arm 41 and a seat member 42. The seat member 42 is movably mounted in the retaining space 312 of the main arm 31, and is movable relative to the main arm 31 in the longitudinal direction of the main arm 31. The pivot arm 41 has two opposite ends respectively and pivotally connected to the seat member 42 and the retention pivoted portion 12 of the first link member 1. In one embodiment, the seat member 42 is formed with a plurality of mounting spaces 421, and two guide ribs 422

(only one is visible in FIG. 2) that respectively and slidably engage the slide grooves 317, 318 of the main arm 31. The pivot arm 41 extends into a mounting groove of the first link member 1 to be pivotally connected to the first link member 1 (see FIG. 3).

The adjusting member 5 is disposed in the retaining space 312 of the main arm 31, and has a main portion 51, and an axle portion 52 that has two opposite ends respectively and rotatably mounted to the pivot holes 315 such that the adjusting member 5 is rotatable relative to the main arm 31 about the rotating axis (A). At least one of the opposite ends of the axle portion 52 is formed with an operating structure 521 that is accessible from the outside of the arm unit 3 for manual operation by virtue of a hand tool. The adjusting member 5 further has a plurality of positioning structures 53 that are formed on an outer surrounding surface of the main portion 51 and that are arranged about the rotating axis (A). In one embodiment, the adjusting member 5 is configured as a cam member that is eccentric with respect to the rotating axis (A), and a distance between one of the positioning structures 53 and the rotating axis (A) is different from that between any other one of the positioning structures 53 and the rotating axis (A).

The driven member 6 is disposed in the retaining space 312 of the main arm 31 and between the adjusting member 5 and the seat member 42, and is movable relative to the main arm 31 in the longitudinal direction of the main arm 31. The driven member 6 has an engaging portion 61 that is operable to engage any one of the positioning structures 53 of the adjusting member 5, a plurality of post portions 63 each of which extends from the engaging portion 61 toward the seat member 42, and a plurality of limiting blocks 64 that respectively and slidably engage the limiting grooves 316 of the main arm 31. In one embodiment, each of the positioning structures 53 of the adjusting member 5 is configured as a groove.

Each of the resilient members 62 has an end that is sleeved on a respective one of the post portions 63 of the driven member 6 and that abuts against the driven member 6, and an opposite end that extends into a respective one of the mounting spaces 421 of the seat member 42 and that abuts against the seat member 42 for resiliently biasing the driven member 6 and the seat member 42 away from each other. In one embodiment, each of the resilient members 62 is configured as a compression spring.

By such, rotation of the adjusting member 5 relative to the main arm 31 about the rotating axis (A) drives movement of the driven member 6 relative to the main arm 31 in the longitudinal direction of the main arm 31, so as to adjust a distance between the driven member 6 and the seat member 42 (i.e., to adjust the change in length of the resilient members 62), and to adjust the biasing force exerted by the resilient members 62.

Figure 4:
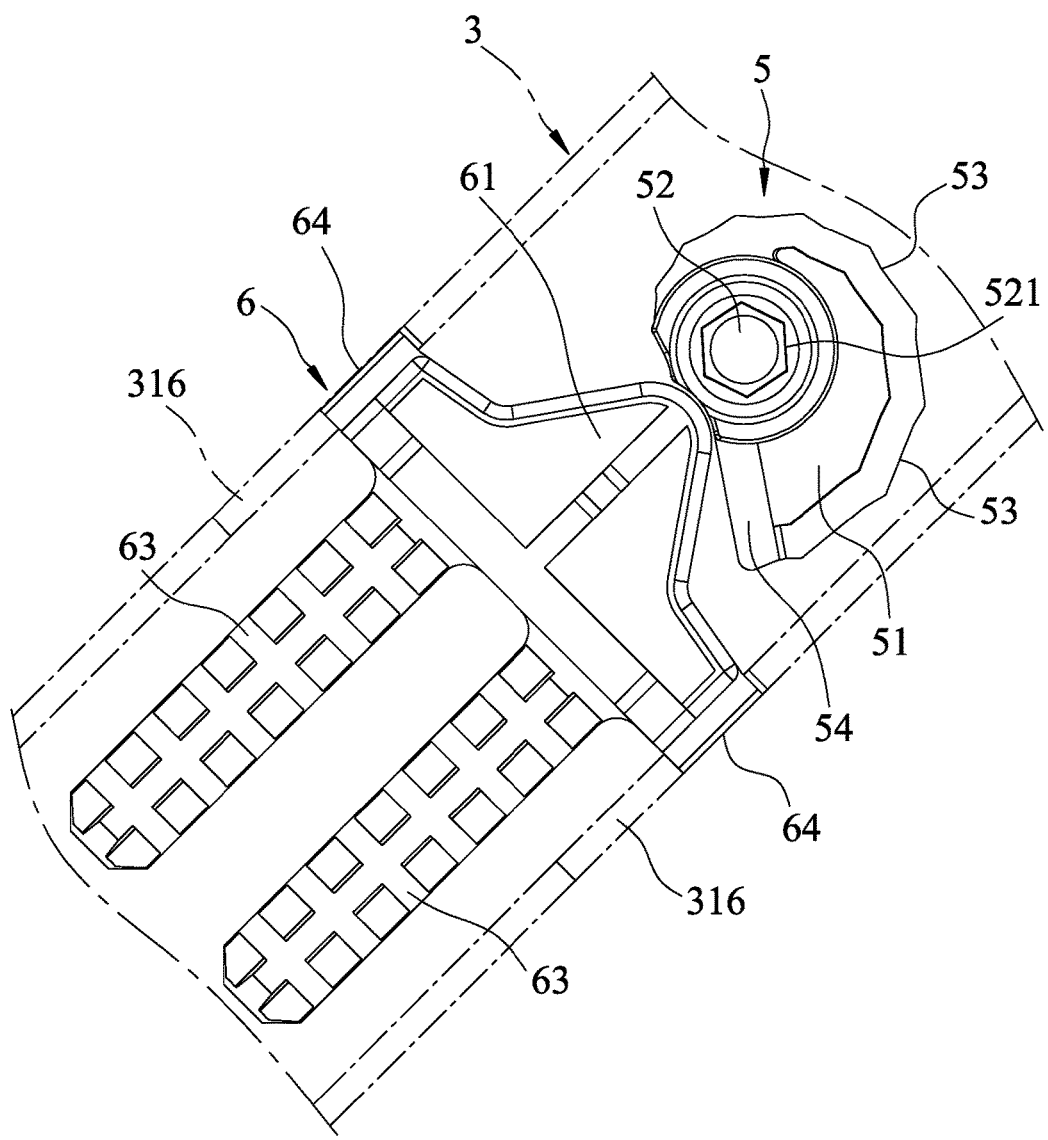
FIG. 4 is a fragmentary side view illustrating an adjusting member and a driven member of the embodiment.
Figure 5:
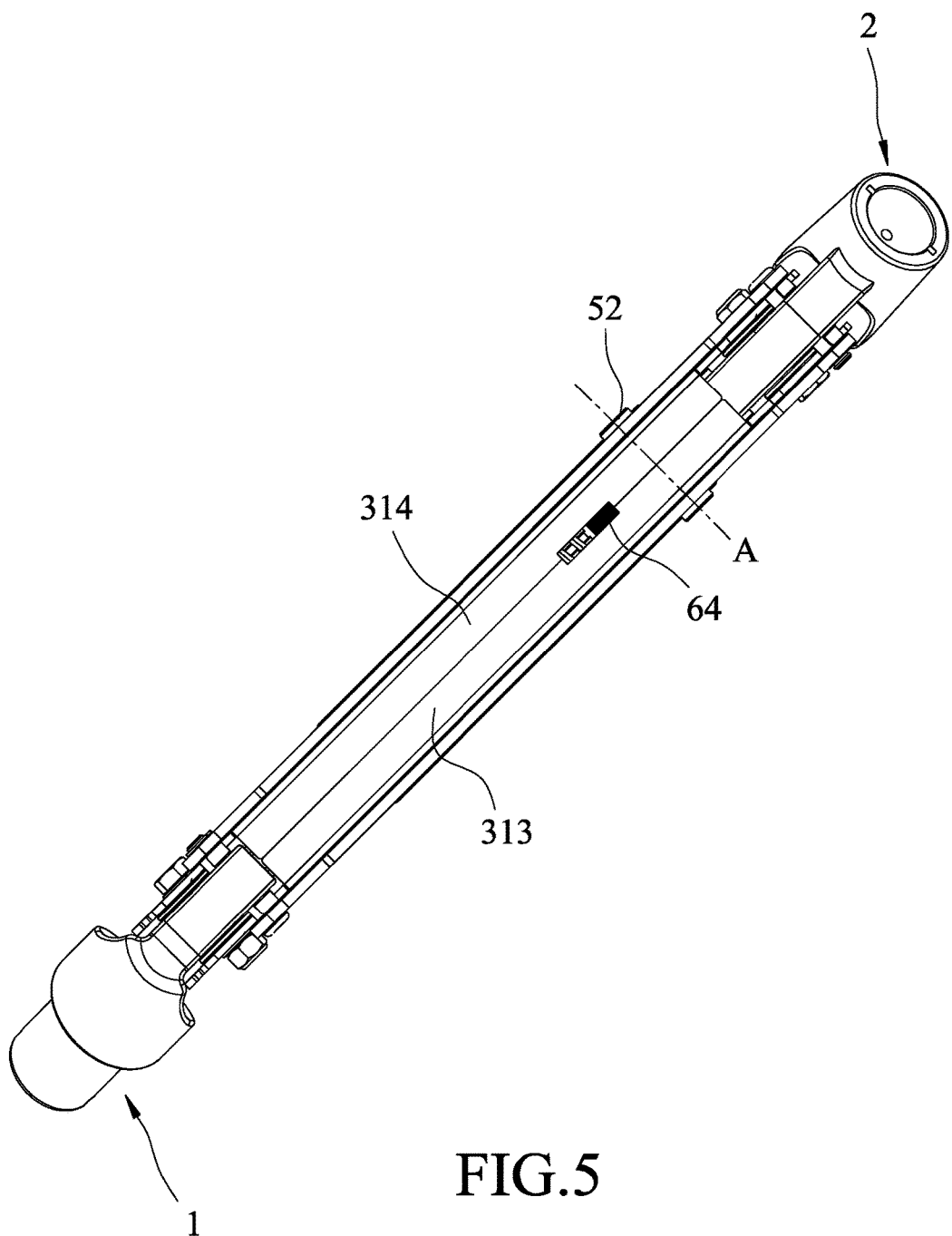
FIG. 5 is a top view illustrating the embodiment.
Figure 6:
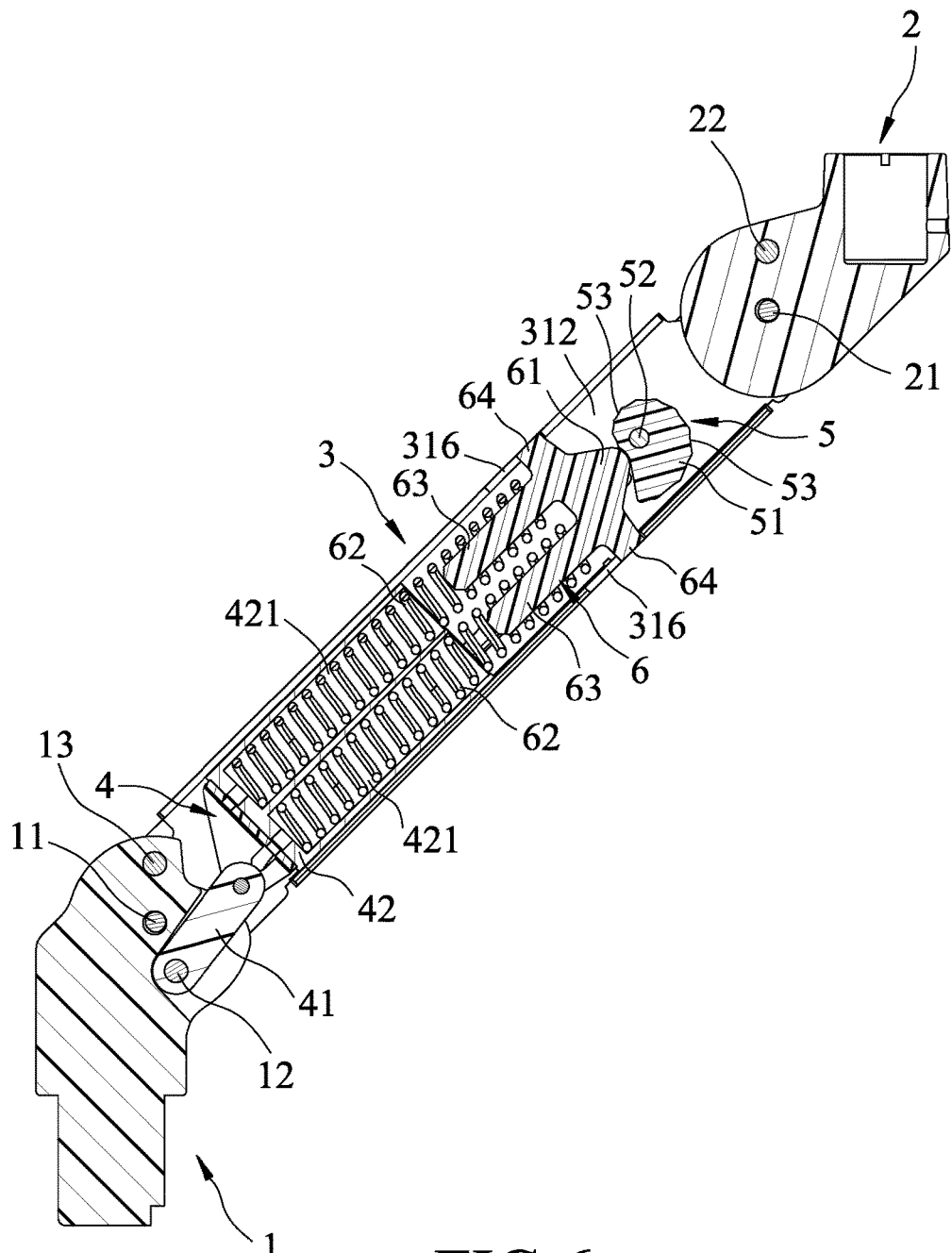
FIG. 6 is a sectional view illustrating the embodiment.
Figure 7:
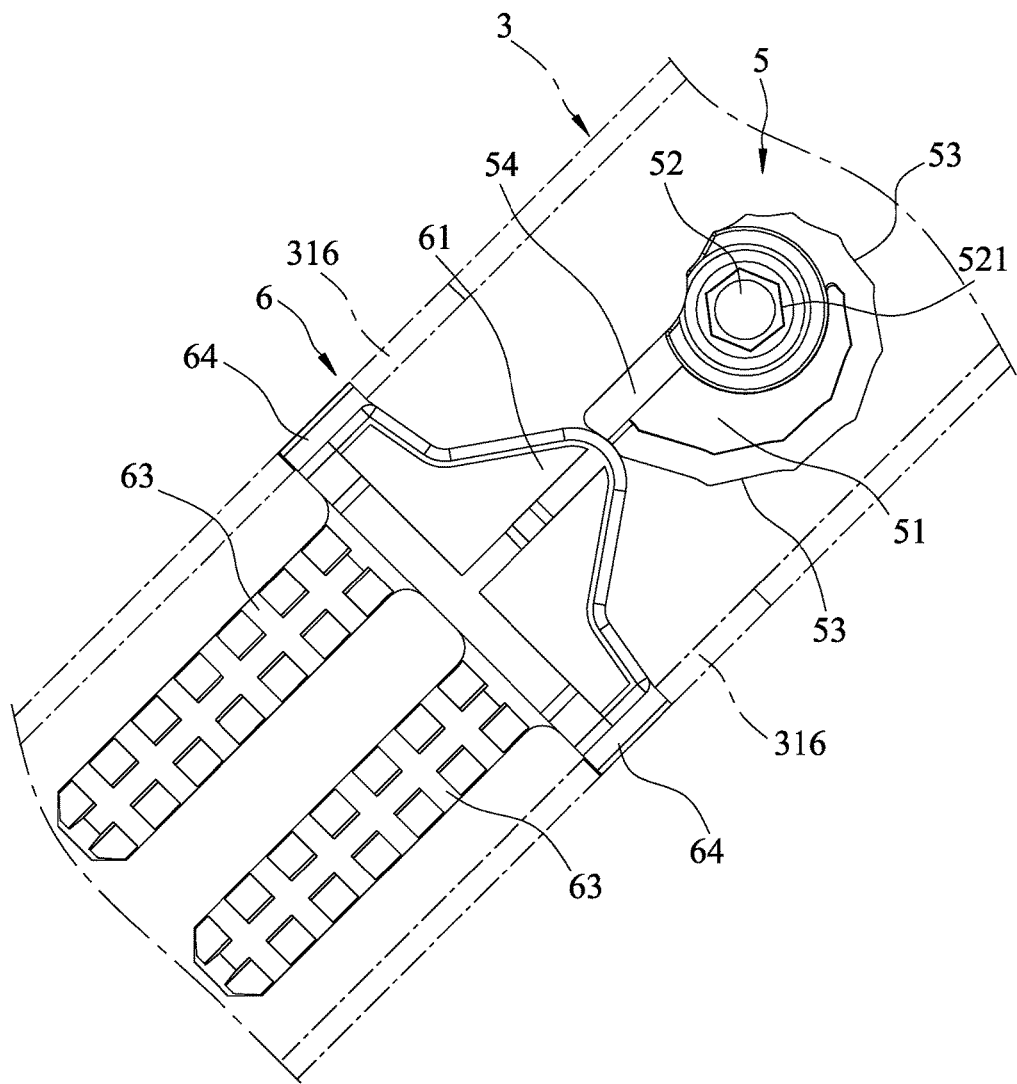
FIG. 7 is another fragmentary side view illustrating the adjusting member and the driven member of the embodiment.
Figure 8:
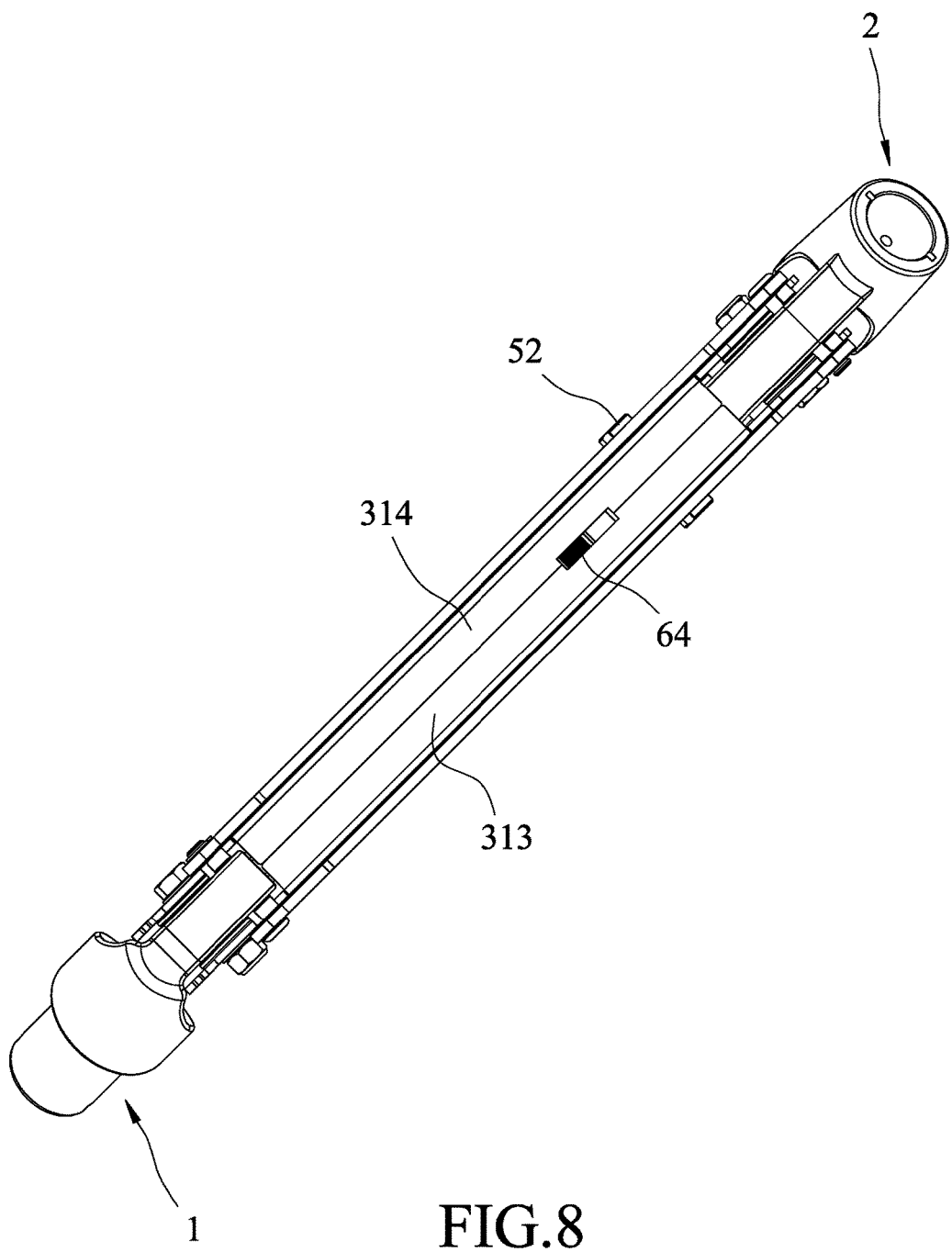
FIG. 8 is another top view illustrating the embodiment.
Figure 9:
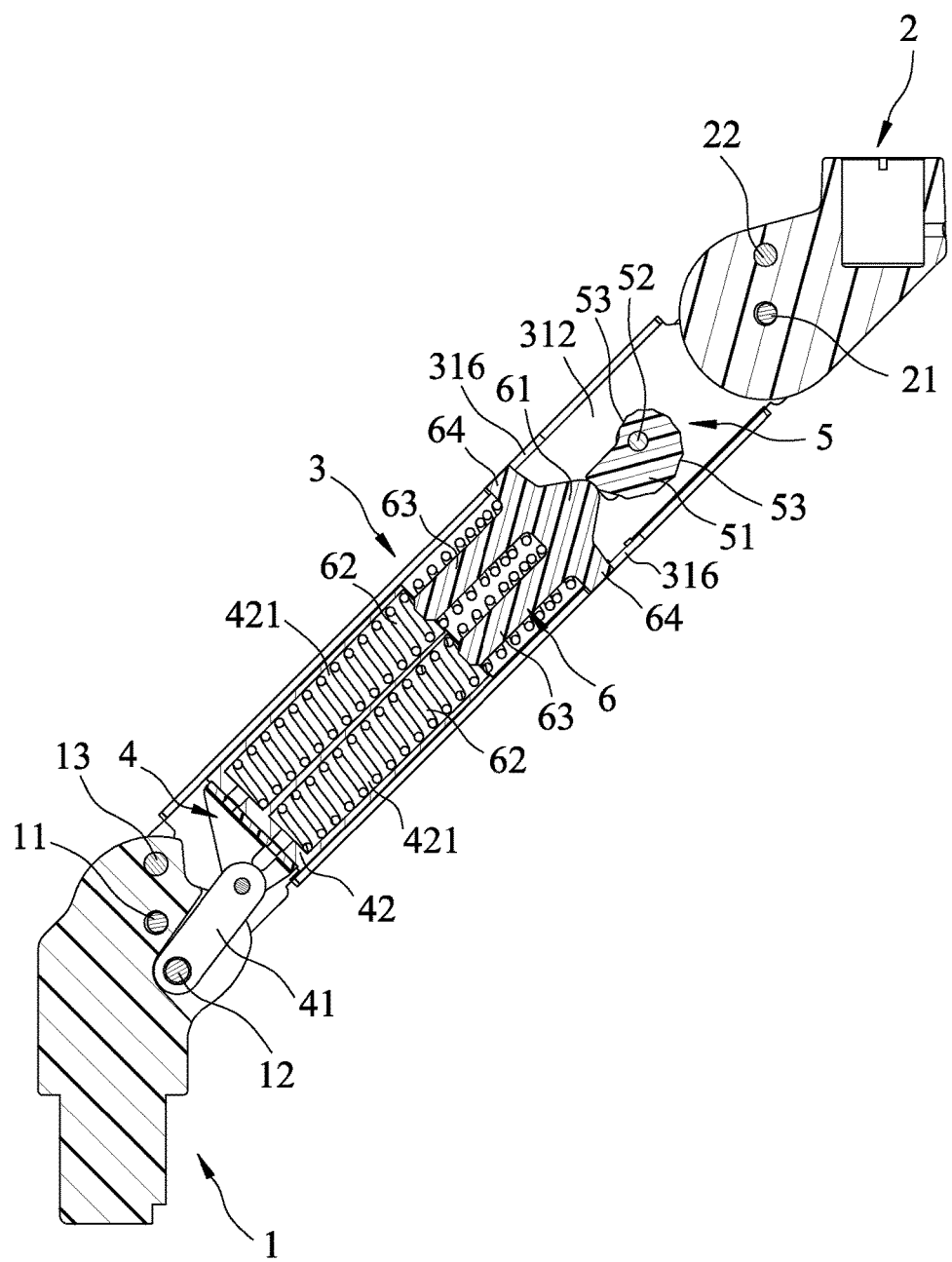
FIG. 9 is another sectional view illustrating the embodiment.

Referring to FIGS. 4 and 7, in one embodiment, the adjusting member 5 has twelve positioning structures 53. The distance between each of the positioning structures 53 and the rotating axis (A) (see FIGS. 1 and 5) increases in a circumferential direction (R, see FIG. 4) of the adjusting member 5. It should be noted that, in one embodiment, the engaging portion 61 of the driven member 6 is prevented from directly moving between the positioning structure 53 that is closest to the rotating axis (A) and the positioning structure 53 that is farthest from the rotating axis (A) by virtue of a stop wall 54 (see FIGS. 4 and 7) of the adjusting member 5 and a limiting protrusion 314a (see FIG. 2) formed on an inner surface of the main arm 31. FIGS. 4 to 6 illustrate the engaging portion 61 of the driven member 6 engages the positioning structure 53 that is closest to the rotating axis (A), so the change in length of the resilient members 62 is relatively small. FIGS. 7 to 9 illustrate the engaging portion 61 of the driven member 6 engages the positioning structure 53 that is farthest from the rotating axis (A), so the change in length of the resilient members 62 is relatively large.

Figure 10:
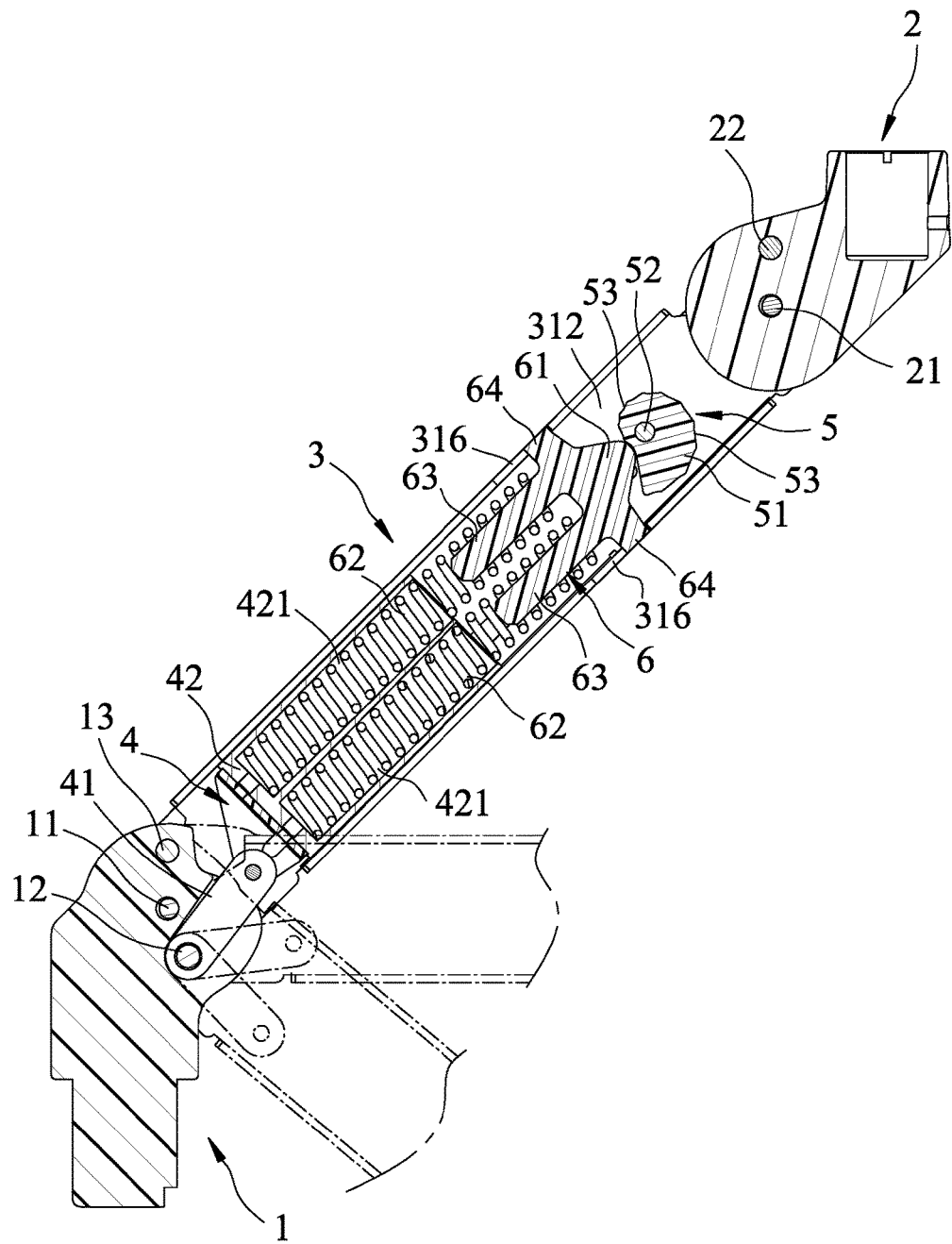
FIG. 10 is a schematic sectional view illustrating the embodiment at an upper position.
Figure 11:
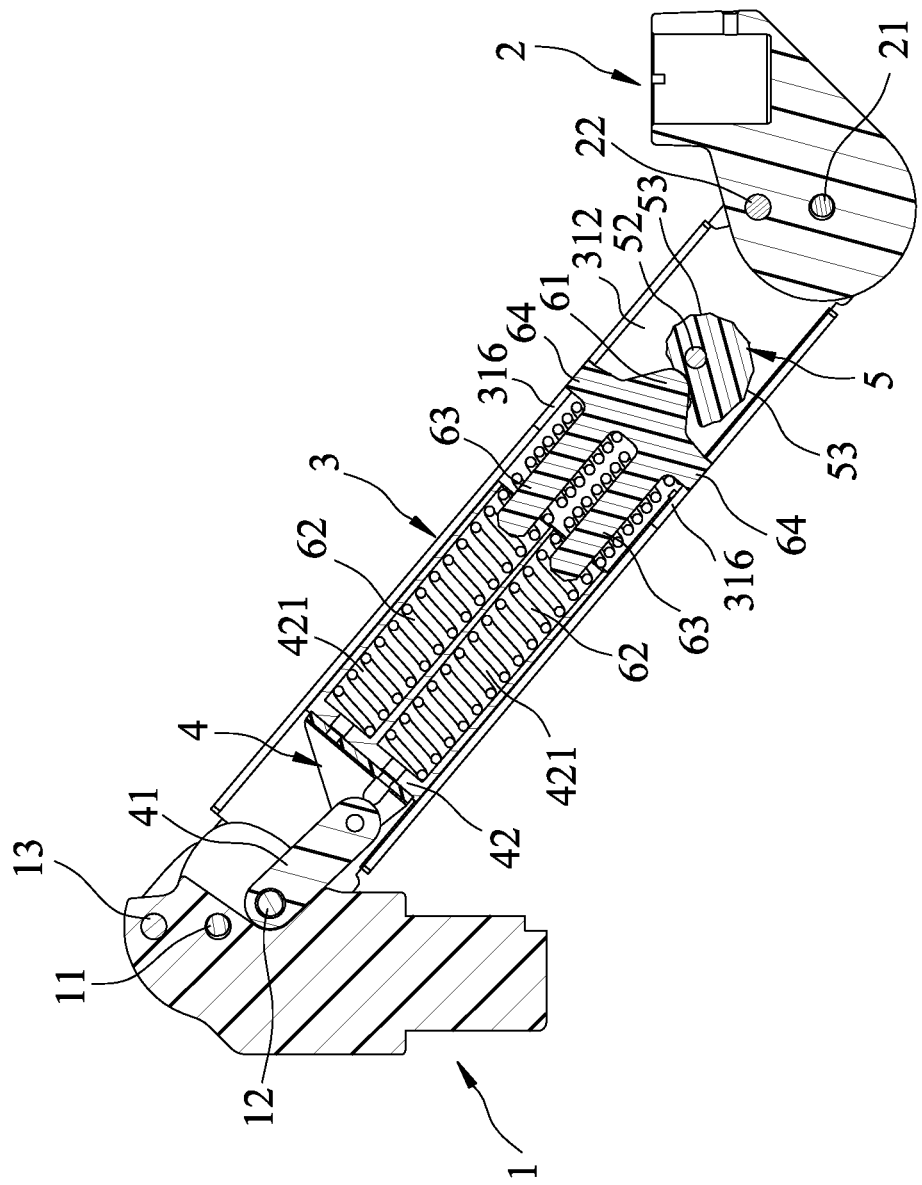
FIG. 11 is another schematic sectional view illustrating the embodiment at a lower position.

The support arm device is movable relative to the first link member 1 between an upper position (see FIG. 10) and a lower position (see FIG. 11), so as to suspend an object (not shown) at different heights (the object is mounted to the second link member 2). The distance between the seat member 42 and the driven member 6 decreases during the movement of the support arm device from the upper position to the lower position. Since the object is mounted to the second link member 2, the gravitational force acting on the object tends to move the seat member 42 and the driven member 6 toward each other (tends to move the support arm device toward the lower position).

To maintain the object at a desired height-wise position, the adjusting member 5 is rotated to adjust the distance between the seat member 42 and the driven member 6 (to adjust the change in length of the resilient members 62) such that the biasing force exerted from the resilient members 62 that resiliently biases the seat member 42 and the driven member 6 away from each other is equal to the resultant force of the gravity that tends to move the seat member 42 and the driven member 6 toward each other so as to maintain the support arm device in a state of static equilibrium.

It should be noted that each of the resilient members 62 may be configured as an extension spring according to the relative position between the retention pivoted portion 12 to which the main arm 31 is pivoted and the main pivoted portion 11 to which the pivot arm 41 is pivoted.

Figure 12:
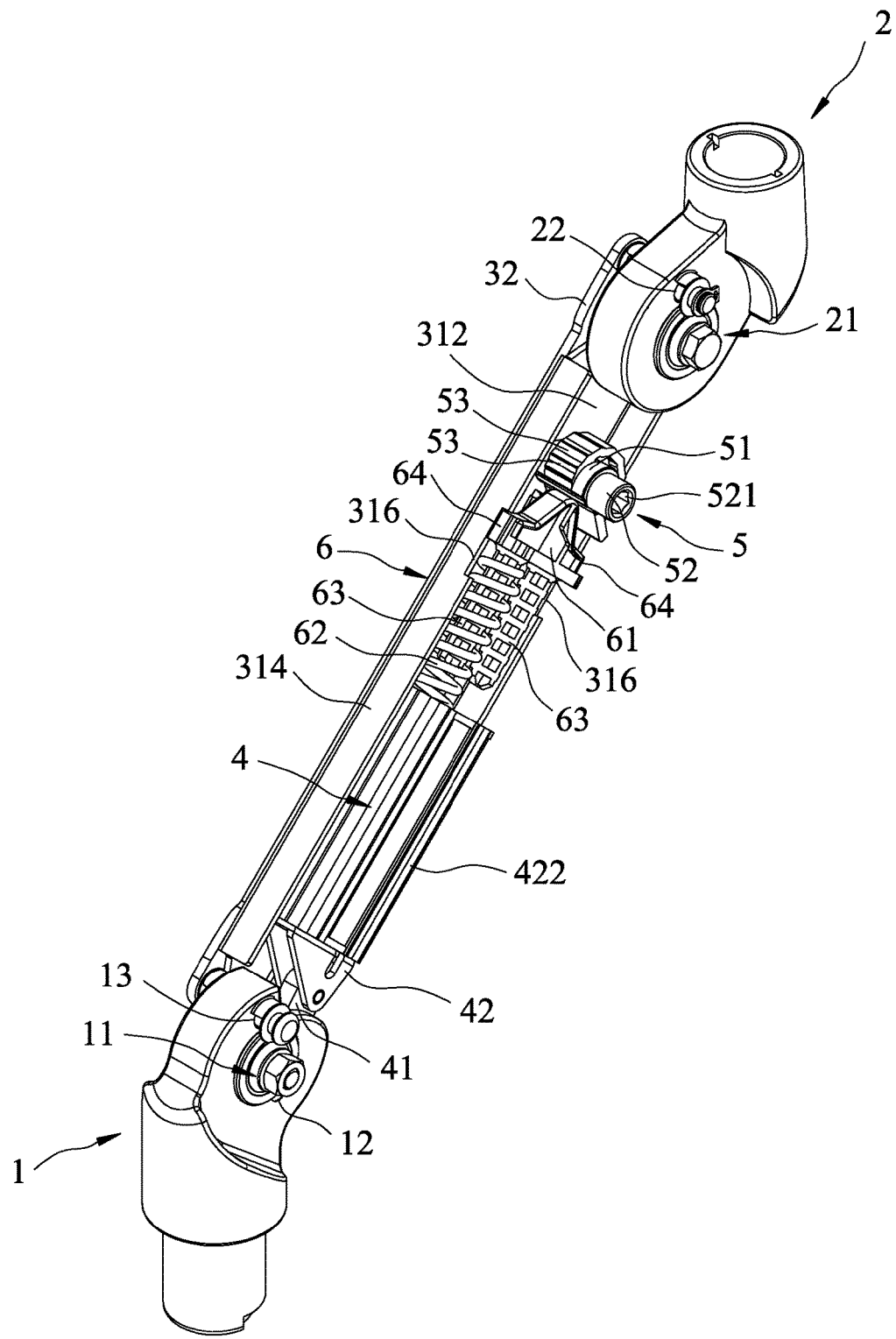
FIG. 12 is a perspective view illustrating a variation of the embodiment.
Figure 13:
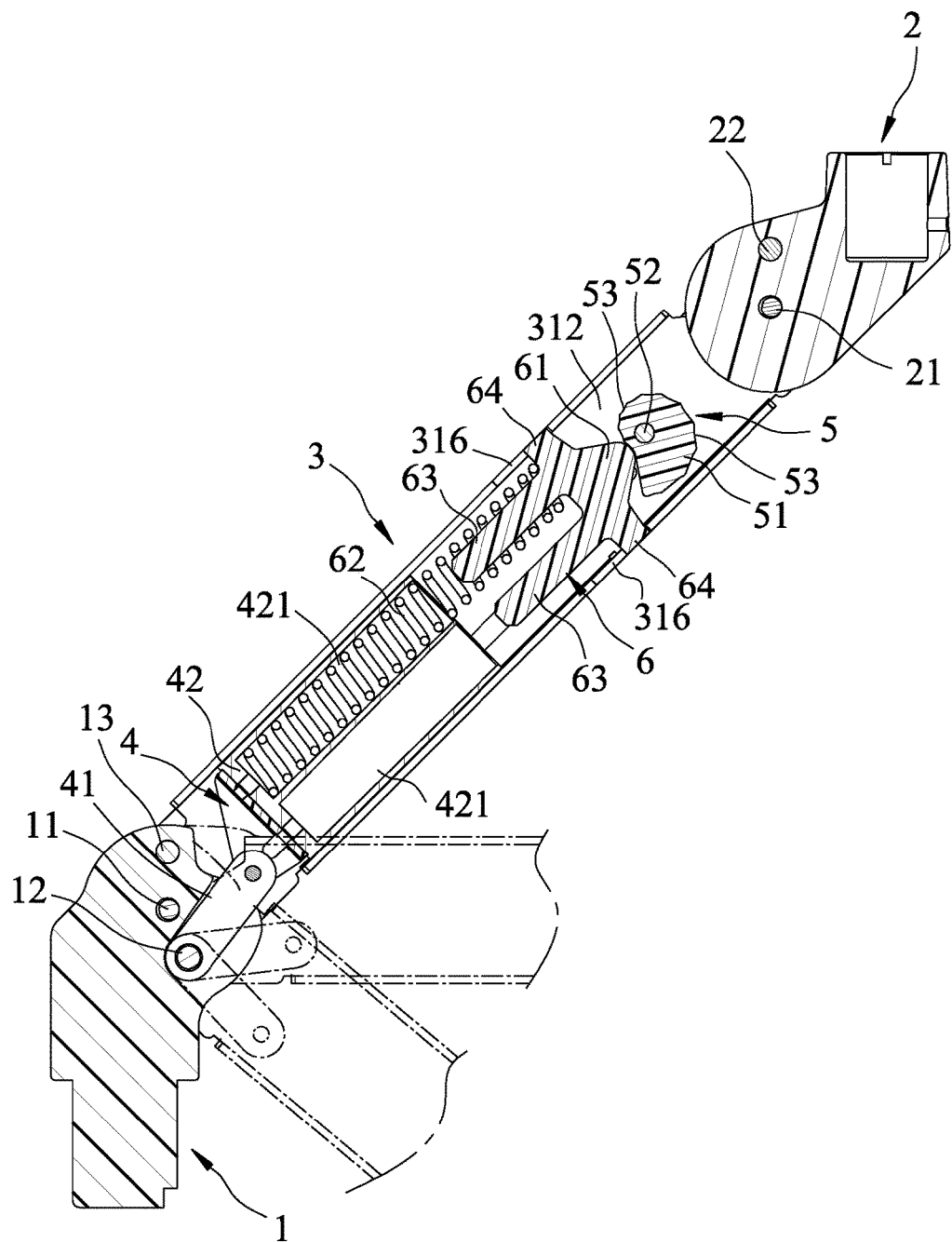
FIG. 13 is a schematic sectional view illustrating the variation of the embodiment.

Referring to FIGS. 12 and 13, a variation of the embodiment includes only one resilient member 62 that has an end sleeved on one of the post portions 63 of the driven member 6 and abutting against the driven member 6, and an opposite end extending into a corresponding one of the mounting spaces 421 of the seat member 42 and abutting against the seat member 42 for resiliently biasing the driven member 6 and the seat member 42 away from each other. The amount of the resilient members 62 and the spring constant of each of the resilient members 62 are adjustable depending on the weight of the object.

The advantages of the support arm device according to the disclosure are as follows:

1. An assembly of the pivot unit 4, the adjusting member 5, the driven member 6 and the resilient members 62 serves to substitute the pneumatic cylinder in the conventional support arm device, and to lower the cost of the support arm device.

2. The twelve positioning structures 53 of the adjusting member 5 serve to provide various height-wise positions at which the object can be located, and to facilitate positioning between the adjusting member 5 and the driven member 6.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A support arm device adapted to be pivotally connected between first and second link members, comprising:
    an arm unit including a main arm that has two opposite ends respectively and pivotally connected to the first and second link members;
    a pivot unit including a seat member that is pivotally connected to the first link member and that is movable relative to said main arm;
    an adjusting member rotatably mounted to said main arm and having a plurality of positioning structures that are formed on an outer surrounding surface thereof;
    a driven member movably mounted to said main arm and associated with said adjusting member and having an engaging portion that is operable to engage any one of said positioning structures of said adjusting member, rotation of said adjusting member relative to said main arm about a rotating axis driving movement of said driven member relative to said main arm in a direction that is substantially orthogonal to the rotating axis, so as to adjust a distance between said driven member and said seat member; and
    two resilient members, each of said resilient members having two opposite ends that are respectively coupled to and abut against said driven member and said seat member.

2. The support arm device as claimed in claim 1, wherein said main arm defines a retaining space therein, and is formed with two pivot holes that are in spatial communication with said retaining space and that are aligned along the rotating axis, said seat member being movably mounted in said retaining space, said adjusting member being disposed in said retaining space, and being rotatably mounted to said pivot holes of said main arm, said driven member being movably mounted in said retaining space and between said adjusting member and said seat member, said at least one resilient member having two opposite ends that respectively abut against said driven member and said seat member.

3. The support arm device as claimed in claim 1, wherein said pivot unit further includes a pivot arm that has an end pivotally connected to said seat member and an opposite end pivotally connected to the first link member and spaced apart from said main arm.

4. The support arm device as claimed in claim 2, wherein:
    said main arm consists of first and second lateral arm parts that cooperatively define said retaining space therebetween, said pivot holes being respectively formed in said first and second lateral arm parts; and
    each of said first and second lateral arm parts is formed with a slide groove that is in spatial communication with said retaining space, said seat member being formed with two guide ribs that respectively and slidably engage said slide grooves.

5. The support arm device as claimed in claim 4, wherein said first and second lateral arm parts further cooperatively define a plurality of limiting grooves each of which is in spatial communication with said retaining space, said driven member further having a plurality of limiting blocks that respectively and slidably engage said limiting grooves.

6. The support arm device as claimed in claim 1, wherein said seat member is further formed with at least one mounting space, said driven member further having at least one post portion that extends toward said seat member, said at least one resilient member having an end that is sleeved on said at least one post portion of said driven member and that abuts against said driven member, and an opposite end that extends into said at least one mounting space of said seat member and that abuts against said seat member.

7. The support arm device as claimed in claim 1, wherein said arm unit further includes a plurality of auxiliary arms each of which has two opposite ends respectively and pivotally connected to the first link member and the second link member, and cooperates with said main arm and the first and second link members to constitute a four-bar linkage.

8. A support arm device adapted to be pivotally connected between first and second link members, comprising:
    an arm unit including a main arm that has two opposite ends respectively and pivotally connected to the first and second link members;
    a pivot unit including a seat member that is pivotally connected to the first link member and that is movable relative to said main arm;
    an adjusting member rotatably mounted to said main arm and having a plurality of positioning structures that are formed on an outer surrounding surface thereof, each of said positioning structures of said adjusting member being configured as a groove;
    a driven member movably mounted to said main arm and associated with said adjusting member and having an engaging portion that is operable to engage any one of said positioning structures of said adjusting member, rotation of said adjusting member relative to said main arm about a rotating axis driving movement of said driven member relative to said main arm in a direction that is substantially orthogonal to the rotating axis, so as to adjust a distance between said driven member and said seat member; and
    at least one resilient member having two opposite ends that are respectively coupled to said driven member and said seat member.

9. The support arm device as claimed in claim 1, wherein said adjusting member is eccentric with respect to the rotating axis.

10. A support arm device adapted to be pivotally connected between first and second link members, comprising:
    an arm unit including a main arm that has two opposite ends respectively and pivotally connected to the first and second link members;
    a pivot unit including a seat member that is pivotally connected to the first link member and that is movable relative to said main arm;
    an adjusting member rotatably mounted to said main arm;
    a driven member movably mounted to said main arm and associated with said adjusting member, rotation of said adjusting member relative to said main arm about a rotating axis driving movement of said driven member relative to said main arm in a direction that is substantially orthogonal to the rotating axis, so as to adjust a distance between said driven member and said seat member; and
    at least one resilient member having two opposite ends that are respectively coupled to said driven member and said seat member;

wherein said adjusting member is eccentric with respect to the rotating axis.

11. The support arm device as claimed in claim 8, wherein said main arm defines a retaining space therein, and is formed with two pivot holes that are in spatial communication with said retaining space and that are aligned along the rotating axis, said seat member being movably mounted in said retaining space, said adjusting member being disposed in said retaining space, and being rotatably mounted to said pivot holes of said main arm, said driven member being movably mounted in said retaining space and between said adjusting member and said seat member, said at least one resilient member having two opposite ends that respectively abut against said driven member and said seat member.

12. The support arm device as claimed in claim 10, wherein said main arm defines a retaining space therein, and is formed with two pivot holes that are in spatial communication with said retaining space and that are aligned along the rotating axis, said seat member being movably mounted in said retaining space, said adjusting member being disposed in said retaining space, being rotatably mounted to said pivot holes of said main arm, and having a plurality of positioning structures that are formed on an outer surrounding surface thereof, said driven member being movably mounted in said retaining space and between said adjusting member and said seat member, and having an engaging portion that is operable to engage any one of said positioning structures of said adjusting member, said at least one resilient member having two opposite ends that respectively abut against said driven member and said seat member.

13. The support arm device as claimed in claim 8, wherein said pivot unit further includes a pivot arm that has an end pivotally connected to said seat member and an opposite end pivotally connected to the first link member and spaced apart from said main arm.

14. The support arm device as claimed in claim 8, wherein said seat member is further formed with at least one mounting space, said driven member further having at least one post portion that extends toward said seat member, said at least one resilient member having an end that is sleeved on said at least one post portion of said driven member and that abuts against said driven member, and an opposite end that extends into said at least one mounting space of said seat member and that abuts against said seat member.

15. The support arm device as claimed in claim 8, comprising two of said resilient members, each of said resilient members having two opposite ends that respectively abut against said driven member and said seat member.

16. The support arm device as claimed in claim 10, wherein said pivot unit further includes a pivot arm that has an end pivotally connected to said seat member and an opposite end pivotally connected to the first link member and spaced apart from said main arm.

17. The support arm device as claimed in claim 10, wherein said seat member is further formed with at least one mounting space, said driven member further having at least one post portion that extends toward said seat member, said at least one resilient member having an end that is sleeved on said at least one post portion of said driven member and that abuts against said driven member, and an opposite end that extends into said at least one mounting space of said seat member and that abuts against said seat member.

18. The support arm device as claimed in claim 10, wherein each of said positioning structures of said adjusting member is configured as a groove.

* * * * *